(No Model.)
L. C. CHAMBERLIN.
CULTIVATOR.
No. 333,280. Patented Dec. 29, 1885.
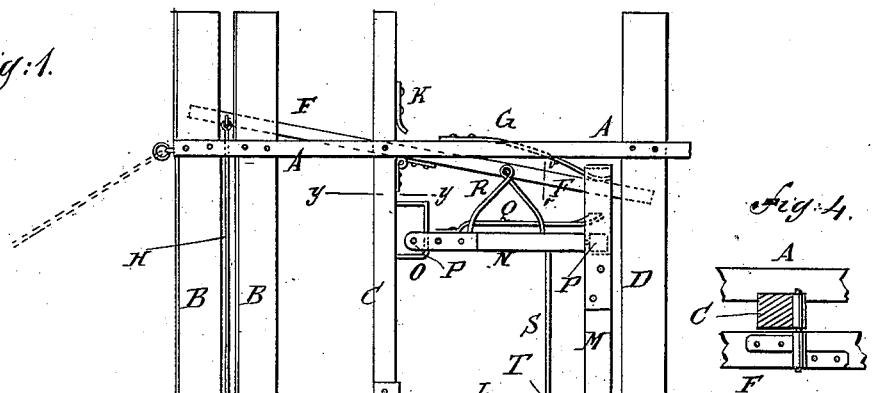
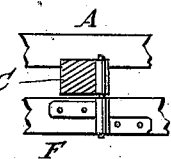
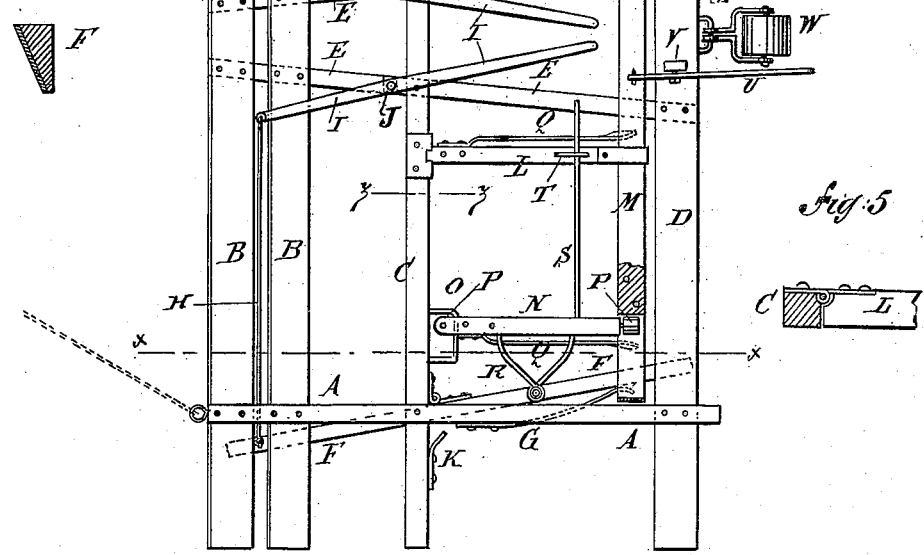
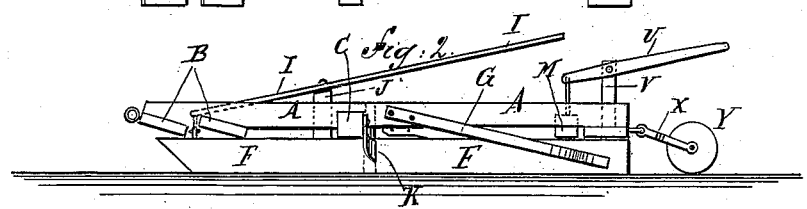
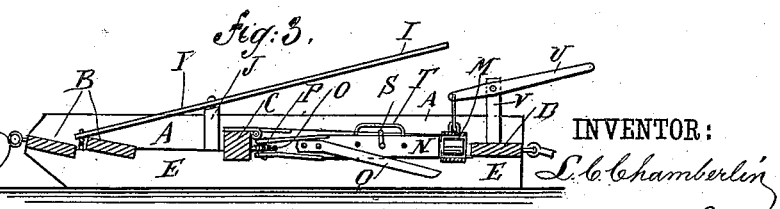
WITNESSES:
Chas Nida
C. Sedgwick
INVENTOR:
L. C. Chamberlin
BY Munn & Co.
ATTORNEYS.
N. PETERS, Photo-Lithographer, Washington, D. C.

UNITED STATES PATENT OFFICE.

LUCIAN CHARLES CHAMBERLIN, OF LATHROP, MISSOURI.

CULTIVATOR.

SPECIFICATION forming part of Letters Patent No. 333,280, dated December 29, 1885.

Application filed May 7, 1885. Serial No. 164,670. (No model.)

*To all whom it may concern:*

Be it known that I, LUCIAN CHARLES CHAMBERLIN, of Lathrop, in the county of Clinton and State of Missouri, have invented certain new and useful Improvements in Cultivators for Small Plants, of which the following is a full, clear, and exact description.

Reference is to be had to the accompanying drawings, forming part of this specification, in which similar letters of reference indicate corresponding parts in all the figures.

Figure 1 is a plan view of one of my improved cultivators. Fig 2 is a side elevation of the same. Fig. 3 is a sectional side elevation of the same, taken through the line $x\,x$, Fig. 1. Fig. 4 is a sectional side elevation of a part of the same, taken through the line $y\,y$, Fig. 1. Fig. 5 is a sectional side elevation of a part of the same, taken through the line $z\,z$, Fig. 1. Fig. 6 is a sectional end elevation of one of the hinged runners, taken through the line $v\,v$, Fig. 1.

The object of this invention is to provide machines for cultivating corn, cotton, and other crops planted in rows or drills to destroy weeds and break in pieces lumps and clods before the plants have come up, or while the plants are small and which shall be so constructed as not to throw soil upon the rows.

The invention consists in a cultivator constructed with two forward bars having their forward edges inclined upward, and middle and rear cross-bars connected by side bars and provided with stationary runners attached to the cross-bars, and spring-held runners hinged to the middle cross-bar, with which is also connected hinged beams and sliding bars connected by a cross-bar and provided with cutters. The hinged runners are provided with rods and levers for adjusting them, and the cross-bar connecting the beams is also provided with a lever for raising the cutters from the ground. With the rear cross-bar is connected a roller by means of a bail to crush any lumps and clods that may have fallen into the hollows between the ridges, as will be hereinafter fully described, and then pointed out in the claims.

A are two side bars, to the forward ends of which the draft is applied, and to the lower side of the forward parts of which are attached at a little distance apart two wide cross-bars, B, with their forward edges higher than their rear edges, as shown in Figs. 1, 2, and 3.

To the lower sides of the side bars, A, a little in front of their centers, is attached a narrow cross-bar, C, and to the lower sides of the rear ends of the said side bars, A, is attached another cross-bar, D.

To the lower sides of the cross-bars B C D, upon the opposite sides of and equally distant from their centers are attached two bars, E, the forward ends of which are at a little distance apart, and which incline from each other toward their rear ends.

To the middle cross-bar, C, at the inner sides of the side bars, A, are hinged two bars, F, similar to the bars E, and which are held in place under ordinary circumstances with their rear ends inclined inward, by springs G. The forward ends of the springs G are attached to the side bars, A, and their rear ends press against the outer sides of the rear parts of the said hinged bars F.

The bars E F serve as runners when drawing the machine from place to place, and as fenders to protect the plants from lumps and clods. The rear ends of the bars E are designed to bear against the adjacent sides of two ridges, and the rear ends of the hinged bars F are designed to bear against the outer sides of the said ridges. With this construction, should the ridges increase in width, the rear ends of the hinged bars F will be pressed outward by the outer sides of the said ridges.

To the forward ends of the hinged bars F are attached the outer ends of rods H, the inner ends of which are attached to levers I, fulcrumed to supports J, attached to the middle part of the machine, so that the said bars F can be adjusted by operating the said levers I when the pressure of the soil is not sufficient to adjust them. The outward movements of the rear ends of the hinged bars F are limited by stops K, attached to the middle cross-bar, C. To the middle cross-bar, C, at a little distance from the bars E, are hinged the forward ends of two beams, L, the rear ends of which are attached to a cross-bar, M, placed at the forward side of the rear cross-bar, D.

In slots in the ends of the cross-bar M, or in keepers attached to the said ends, are placed the ends of two beams, N, the forward ends of which are hinged to and slide upon long staples O, attached to the middle cross-bar, C, at a little distance from the hinged bars F. The friction between the ends of the beams N and the cross-bar M and staples O is lessened by rollers P, pivoted to the said ends of the beams N.

To the outer sides of the forward ends of the beams L N are attached the forward ends of knives or cutter Q, which extend back along the outer sides of the said beams, and have their rear ends curved outward. With this construction, as the machine is drawn forward the knives cut up and destroy any weeds that may be growing at the sides of the rows of plants, and at the same time loosen the soil along the said sides of the rows of plants.

To the outer sides of the middle parts of the beams N are rigidly attached brackets R, which are hinged to the inner sides of the hinged bars F, so that the said beams will be moved out and in by the movements of the said hinged bars F. To the inner sides of the beams N are rigidly attached the outer ends of rods S, which pass through guide-staples attached to the beams L to cause the said beams N to move out and in squarely. The runners E F on the sides with which the soil comes in contact are beveled, as shown in Fig. 6, from their middle parts to their rear ends, and should be plated with iron. By this construction the beveled sides of the runners correspond with the slope of the ridges and insure a right and left movement of the hinged runners F and the sliding beams N.

With this machine weeds can be destroyed and lumps and clods broken in pieces before the plants have come up, and while the said plants are small without injuring the said plants.

To the cross-bar M is pivoted the end of a lever, U, which is fulcrumed to a support, V, attached to the rear cross-bar, D, so that by operating the lever U the bar M, and with it the beams L N and cutters Q, can be readily raised from the ground for convenience in turning around and passing from place to place.

W is a roller journaled to a bail X, which is hinged to the center of the rear cross-bar, D, so as to roll along the hollow between the ridges and crush any lumps and clods that may have fallen into the said hollow.

Having thus fully described my invention, I claim as new and desire to secure by Letters Patent—

1. A cultivator constructed substantially as herein shown and described, and consisting of the side bars, A, the forward cross-bars, B, having their forward edges inclined upward, the middle and rear cross-bars, C D, the stationary runners E, attached to the cross-bars, the side runners, F, hinged to the middle cross-bar, the springs G, holding the hinged runners in place, the beams L, hinged to the middle cross-bar, the sliding beams N, connected with the hinged runners, the cutters Q, attached to the beams, and the bar M, connecting the beams, as set forth.

2. In a cultivator, the combination, with the middle cross-bar, C, and the spring-held hinged runners F, of the hinged beams L, the sliding beams N, having rollers P, the cutters Q, and the connected cross-bar M, substantially as herein shown and described, whereby the said beams and cutters will adjust themselves to the width of the ridges, as set forth.

3. In a cultivator, the combination, with the frames A B C D E and the spring-held hinged runners F, connected with the sliding beams, of the rods H, levers I, and standards J, substantially as herein shown and described, whereby the said hinged runners and sliding beams can be readily adjusted, as set forth.

4. In a cultivator, the combination, with the sliding beams N, the hinged beams L, and the connecting-bar M, of the rods S and staples F, substantially as herein shown and described, whereby the said sliding beams are made to move squarely, as set forth.

5. In a cultivator, the combination, with the rear cross-bar, D, of the frame, the connecting cross-bar M, the hinged beams L, the sliding beams N, and the cutters Q, of the lever U, substantially as herein shown and described, whereby the said cutters can be readily raised from the ground, as set forth.

6. The combination, with the framing, of the inner runner-bars diverging from front to rear, the outer runner-bars converging normally toward their rear ends, and springs for supporting said outer runners, substantially as set forth.

7. The combination of the framing, the inner runners having their forward ends slightly separated and diverging from front to rear, and the outer runners converging toward their rear ends, and a roller supported and bearing in rear of and in line with the space between the forward ends of the inner runners, all arranged and adapted to operate substantially as set forth.

LUCIAN CHARLES CHAMBERLIN.

Witnesses:
T. H. B. TURNER,
J. O. DANIELS.